United States Patent
Hirashita et al.

(10) Patent No.: US 8,708,728 B2
(45) Date of Patent: Apr. 29, 2014

(54) POWER PLUG LOCKING DEVICE

(75) Inventors: Takahiro Hirashita, Aichi (JP); Keiji Kahara, Aichi (JP); Toshiharu Katagiri, Aichi (JP)

(73) Assignee: Kabushiki Kaisha Tokai Rika Denki Seisakusho, Aichi (JP)

(*) Notice: Subject to any disclaimer, the term of this patent is extended or adjusted under 35 U.S.C. 154(b) by 87 days.

(21) Appl. No.: 13/418,988

(22) Filed: Mar. 13, 2012

(65) Prior Publication Data

US 2012/0238122 A1    Sep. 20, 2012

(30) Foreign Application Priority Data

Mar. 18, 2011 (JP) ................... 2011-061093

(51) Int. Cl.
*H01R 13/62* (2006.01)

(52) U.S. Cl.
USPC .......................................................... 439/304

(58) Field of Classification Search
USPC ............ 439/304, 310, 352, 358, 34, 133, 372
See application file for complete search history.

(56) References Cited

U.S. PATENT DOCUMENTS

| | | | |
|---|---|---|---|
| 5,536,173 A * | 7/1996 | Fujitani et al. ................ | 439/34 |
| 5,751,135 A * | 5/1998 | Fukushima et al. ........... | 320/107 |
| 6,194,854 B1 * | 2/2001 | Uchibori et al. .............. | 318/280 |
| 6,203,355 B1 * | 3/2001 | Neblett et al. ................ | 439/372 |
| 7,950,943 B2 * | 5/2011 | Ohtomo ........................ | 439/299 |
| 8,016,604 B2 * | 9/2011 | Matsumoto et al. .......... | 439/304 |
| 8,025,526 B1 * | 9/2011 | Tormey et al. ................ | 439/528 |
| 8,075,329 B1 * | 12/2011 | Janarthanam et al. ........ | 439/304 |
| 8,172,599 B2 * | 5/2012 | Konchan ....................... | 439/352 |
| 8,206,172 B2 * | 6/2012 | Katagiri et al. ............... | 439/352 |
| 8,251,734 B2 * | 8/2012 | Katagiri et al. ............... | 439/352 |
| 8,262,402 B2 * | 9/2012 | Gaul et al. .................... | 439/304 |
| 8,317,534 B2 * | 11/2012 | Osawa et al. ................. | 439/353 |
| 8,357,001 B2 * | 1/2013 | Katagiri et al. ............... | 439/304 |
| 8,357,002 B2 * | 1/2013 | Katagiri et al. ............... | 439/304 |
| 8,376,767 B2 * | 2/2013 | Kahara et al. ................. | 439/304 |
| 8,376,768 B2 * | 2/2013 | Kurumizawa et al. ........ | 439/304 |
| 2011/0034053 A1 * | 2/2011 | Matsumoto et al. .......... | 439/304 |
| 2011/0223792 A1 * | 9/2011 | Osawa et al. ................. | 439/345 |
| 2012/0088382 A1 * | 4/2012 | Konchan ....................... | 439/153 |

FOREIGN PATENT DOCUMENTS

JP            9-161898         6/1997

* cited by examiner

*Primary Examiner* — Gary Paumen
(74) *Attorney, Agent, or Firm* — Greenblum & Bernstein P.L.C.

(57) ABSTRACT

A power plug locking device that prevents unauthorized removal of a power plug from an inlet includes a lock member pivoted about its axis. The lock member is pivoted between a lock position, at which the lock member locks the power plug to the inlet, and an unlock position, at which the lock member releases the power plug from a state locked to the inlet. A manual operation unit is manually operated to pivot the lock member from the unlock position to the lock position. A position holding unit is formed to hold the lock member at the lock position and maintain the power plug in a locked state with the lock member.

9 Claims, 11 Drawing Sheets

Fig.5
Unlock State

Fig.6
Lock State

POWER PLUG LOCKING DEVICE

CROSS-REFERENCE TO RELATED APPLICATIONS

This application is based upon and claims the benefit of priority from prior Japanese Patent Application No. 2011-061093, filed on Mar. 18, 2011, the entire contents of which are incorporated herein by reference.

BACKGROUND

The present invention relates to a power plug locking device that locks a power plug to an object, such as a vehicle, and prevents unauthorized removal of the power plug from the object.

Over these recent years, consumers have become conscious of environmental problems. Thus, vehicles that emit less carbon dioxide such as hybrid vehicles and electric vehicles have become popular. Such vehicles are driven by a battery-powered motor. When such a vehicle travels over a long distance and the state of charge of the battery becomes low, the battery must be charged (refer to Japanese Laid-Open Patent Publication No. 9-161898).

The charging of a battery involves an electrolytic reaction of compounds and ions in battery cells of the battery. This lengthens the charging time. Thus, when a user leaves the vehicle while the battery is being charged, someone may remove the power plug to steal electricity. Hence, power plug locking devices have been developed to prevent unauthorized removal of the power plug from a vehicle.

One type of such a power plug locking device includes a structure for manually switching the locking device from an unlock state to a lock state. This allows the user to switch the locking device to a lock state only when necessary and prevents early wear of components. However, such structure requires an operation unit operated to switch the locking device to a lock state. This enlarges the locking device.

SUMMARY

The present invention provides a power plug locking device that may be manually switched to a lock state in addition to being miniaturized.

One aspect of the present invention is a power plug locking device that prevents unauthorized removal of a power plug from an inlet. The power plug locking device includes lock member having an axis. The lock member is formed to pivot about the axis. The lock member is pivoted between a lock position, at which the lock member locks the power plug to the inlet, and an unlock position, at which the lock member releases the power plug from a state locked to the inlet. A manual operation unit is manually operable to pivot the lock member from the unlock position to the lock position. A position holding unit is formed to hold the lock member at the lock position and maintain the power plug in the locked state with the lock member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of a power plug locking device according to the present invention will now be described with reference to FIGS. 1 to 17.

Figure 1:
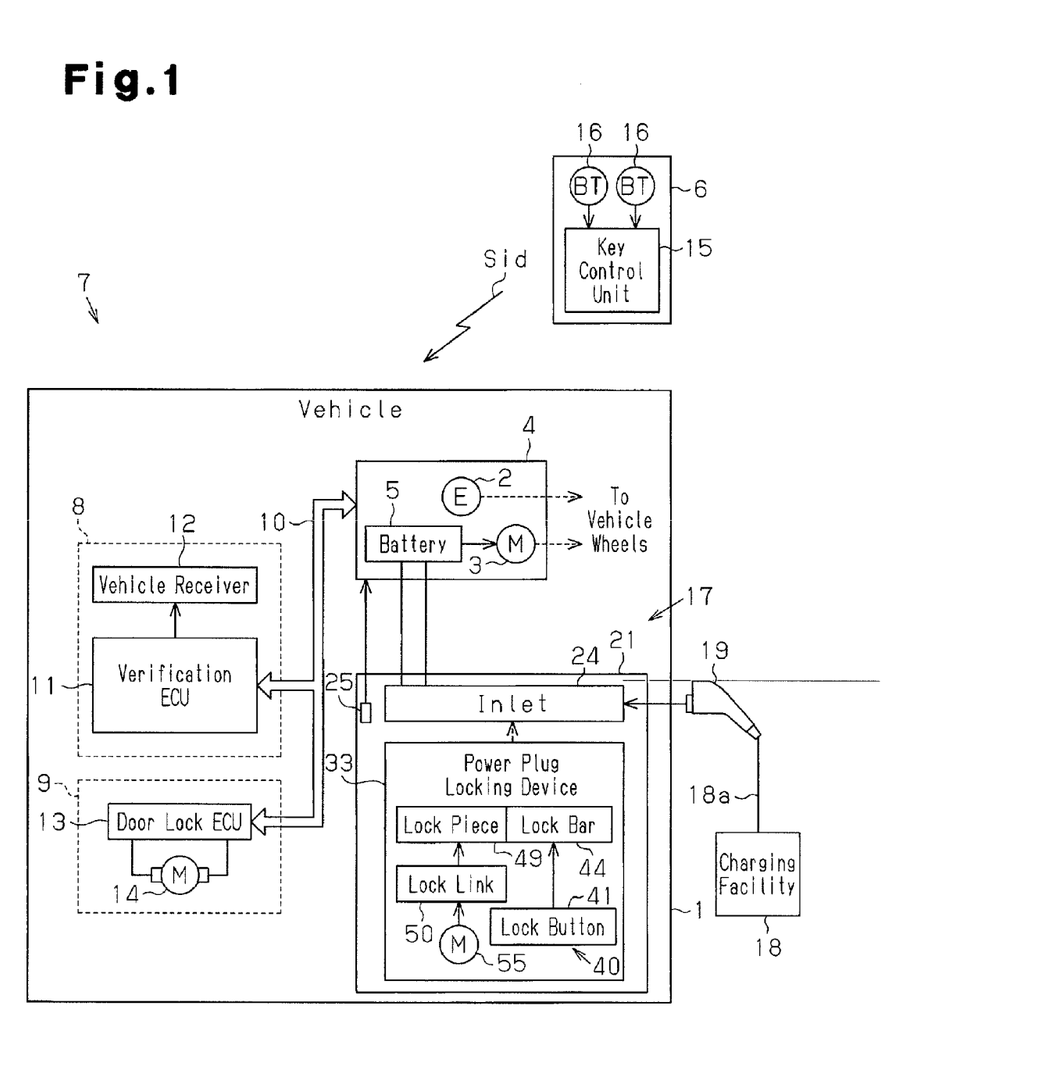
FIG. 1 is a schematic diagram of a vehicle in a first embodiment.

Referring to FIG. 1, a hybrid vehicle 1 includes an engine 2 and a motor 3, which form a hybrid system 4 and generate power to rotate vehicle wheels. The hybrid system 4 includes a battery 5, which serves as a power supply for the motor 3. The vehicle 1 is driven in various modes, such as a mode that drives the vehicle with the motor 3 by generating electric power with the engine 2, a mode that drives the vehicle 1 with the power of both the engine 2 and the motor 3, and a mode that drives the vehicle 1 with the power of only the motor 3.

An electronic key system 7 is installed in the vehicle 1 to perform ID verification through wireless communication with an electronic key 6 and then actuate the vehicle 1. The electronic key system 7 of the present example is a wireless key system that starts ID verification upon establishment of communication with the electronic key 6.

In the wireless key system 1, the vehicle 1 includes a key verification device 8, which verifies the ID of the electronic key 6, and a door locking device 9, which locks and unlocks a vehicle door. The door locking device 9 is connected to the key verification device 8 by an in-vehicle bus 10. The key verification device 8 includes a verification electronic control unit (ECU) 11, which controls operation of the key verification device 8. The verification ECU 11 includes a memory (not shown) in which an ID code of the electronic key 6 is registered. A vehicle receiver 12, which receives radio waves in an ultrahigh frequency (UHF) band, is connected to the verification ECU 11. The door locking device 9 includes a door lock ECU 13, which controls the locking and unlocking of the vehicle door. A door lock motor 14, which serves as a drive source for locking and unlocking the vehicle door, is connected to the door lock ECU 13.

The electronic key 6 includes a key control unit 15, which manages the communication operation of the electronic key 6. The key control unit 15 includes a memory (not shown) in which an ID code of the electronic key 6 is registered. The electronic key 6 includes a plurality of buttons 16, which are manually operated to have the vehicle 1 perform an action through remote control. The buttons 16 include a lock button, which locks the vehicle door, and an unlock button, which unlocks the vehicle door.

When one of the buttons 16 is operated, the electronic key 6 transmits a wireless signal Sid on a radio wave in the UHF band. The wireless signal Sid includes the ID code of the electronic key 6 and a functional code corresponding to operated button 16. The verification ECU 11 receives the wireless signal Sid with the vehicle receiver 12 and verifies the ID code in the wireless signal Sid with the ID code registered in the verification ECU 11. When ID verification is accomplished, the verification ECU 11 has the vehicle perform an action that is in accordance with the functional code in the wireless signal Sid.

For instance, when the vehicle door is locked, the verification ECU 11 receives a door lock request signal, which is a wireless signal Sid, from the electronic key 6, and performs ID verification. When the ID verification is accomplished, the door lock ECU 13 has the door lock motor 14 produce, for example, forward rotation to lock the vehicle door to the vehicle body with a locking member (not shown). This locks the vehicle door. Further, when the vehicle door is unlocked, the verification ECU 11 receives a door unlock request signal, which is a wireless signal Sid, from the electronic key 6, and performs ID verification. When the ID verification is accomplished, the door lock ECU 13 has the door lock motor 14 produce reverse rotation to remove the locking member of the vehicle door from the vehicle body. This unlocks the vehicle door.

The vehicle 1 includes a charge system 17 that charges the battery 5 with an external power supply. The charge system 17 uses a charging facility, such as a charging station or a residential power outlet, to charge the battery 5. The charging facility 18 includes a charge cable 18a. A power plug 19 is arranged on a distal end of the charge cable 18a. The power plug 19 can be connected to the vehicle 1.

Figure 2:
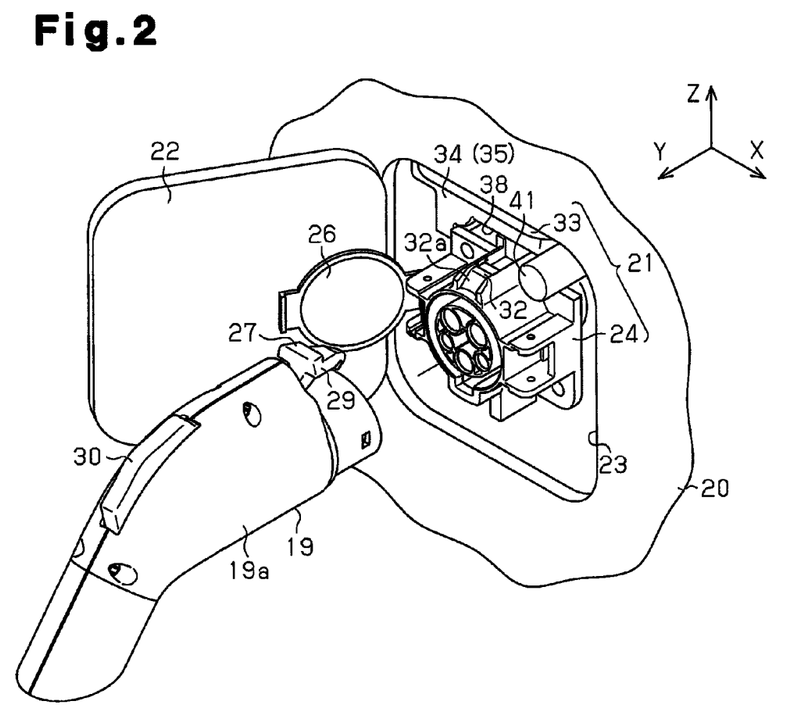
FIG. 2 is a perspective view showing a power plug and an inlet.

Referring to FIGS. 1 and 2, a power reception connector 21, to which the power plug 19 can be connected, is arranged in a left (or right) rear side wall of a vehicle body 20. The power reception connector 21 is accommodated in an accommodation compartment 23, which is closed by a lid 22. The power reception connector 21 includes an inlet 24 accommodating electric connection terminals (e.g., power terminal and control terminal). A plug connection detector 25 is arranged in the inlet 24 to detect whether the power plug 19 is completely fitted to the inlet 24. A rubber cap 26 covers the electric connection terminals in the inlet 24.

Figure 3:
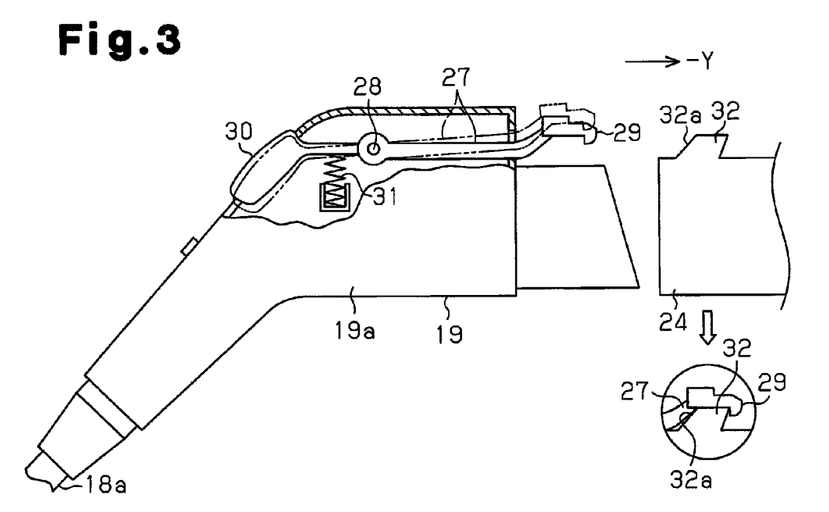
FIG. 3 is a side view, partially in cross-section, showing the structure of the power plug and how the power plug is connected to a vehicle.

Referring to FIGS. 2 and 3, the power plug 19 includes a plug body 19a. The plug body 19a accommodates electrical connection terminals, which are connected to the electrical connection terminals of the inlet 24. The plug body 19a includes a lock arm 27. The lock arm 27 is pivotally coupled to the plug body 19a. The lock arm 27 is used to keep the power plug 19 in the inlet 24. The lock arm 27 is pivoted upward and downward about a pivot shaft 28, which is arranged in the middle of the lock arm 27. The lock arm 27 includes a distal portion defining a hook 29 and a basal portion defining a lever 30. The hook 29 and lever 30 are exposed from the plug body 19a. An urging member 31 is arranged near the lever 30 to urge the lock arm 27 and force the hook 29 in a closing direction.

To connect the power plug 19 to the power reception connector 21, the power plug 19 is fitted straight in an insertion direction (−Y axis direction of FIG. 3) into the power reception connector 21. This guides and raises the hook 29 along a sloped surface 32a of a projection 32 on the inlet 24. When the plug 19 is completely fitted to the inlet 24, the urging force of the urging member 31 pivots the lock arm 27 and hooks the hook 29 to the projection 32. This prevents separation of the power plug 19 from the inlet 24.

The hybrid system 4 includes a control unit (not shown). When the control unit determines with the plug connection detector 25 that the power plug 19 has been completely fitted to the inlet 24, the control unit sends a charge start request to the charging facility 18 through the power plug 19. When the charging facility 18 receives the charge start request, the power plug 19 starts supplying power to the power reception connector 21 and charges the battery 5. When determining that the battery 5 has been fully charged, the control unit of the hybrid system 4 sends a charge end request to the charging facility 18. When receiving the charge end request, the charging facility 18 stops supplying power to the power reception connector 21 from the power plug 19. This ends the charging operation.

When removing the power plug 19 from the inlet 24, the lever 30 is pressed to pivot the lock arm 27 in an opening direction. This separates the lock arm 27 from the projection 32. In this state, the power plug 19 is pulled straight and removed from the inlet 24.

Figure 4:
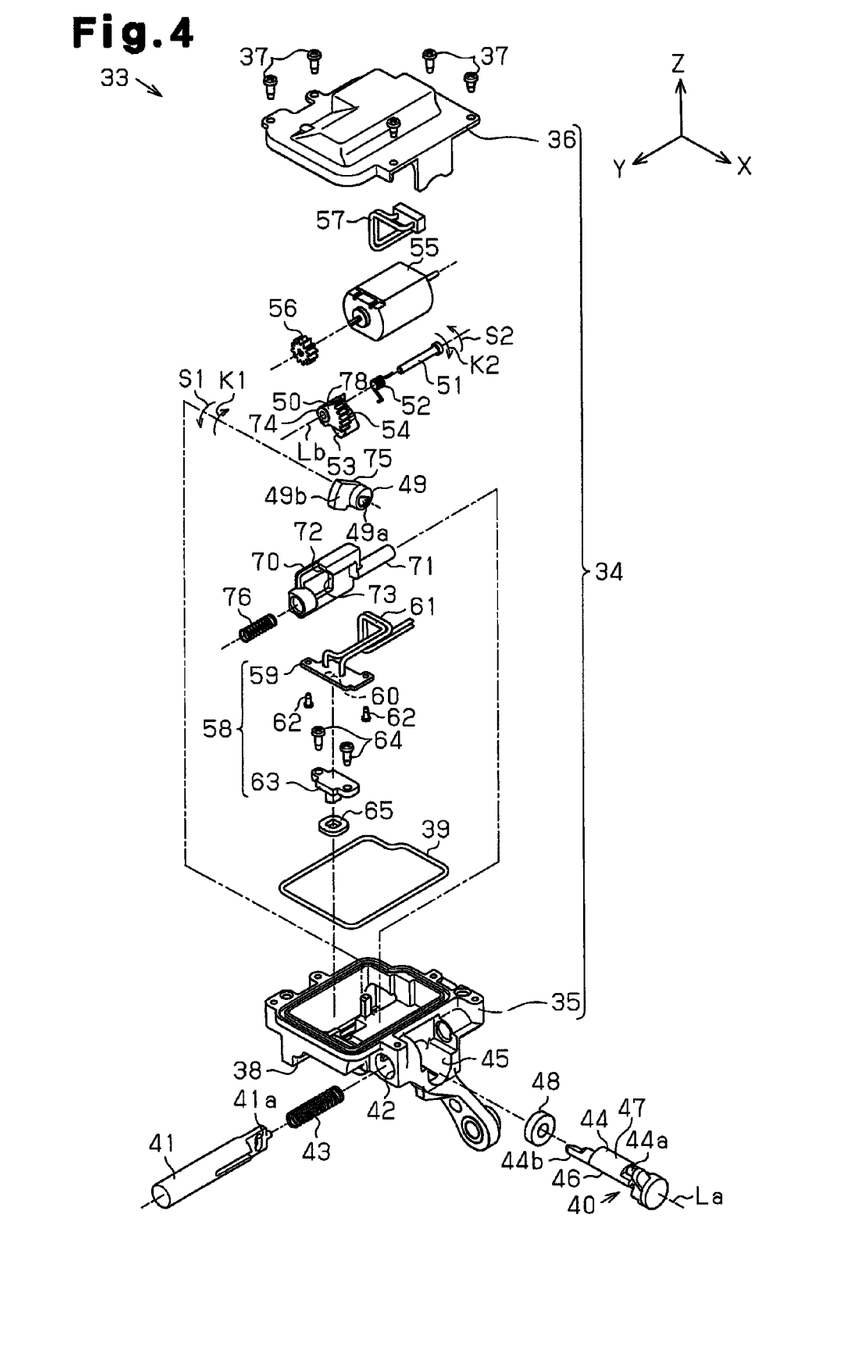
FIG. 4 is an exploded perspective view showing a power plug locking device.
Figure 5:
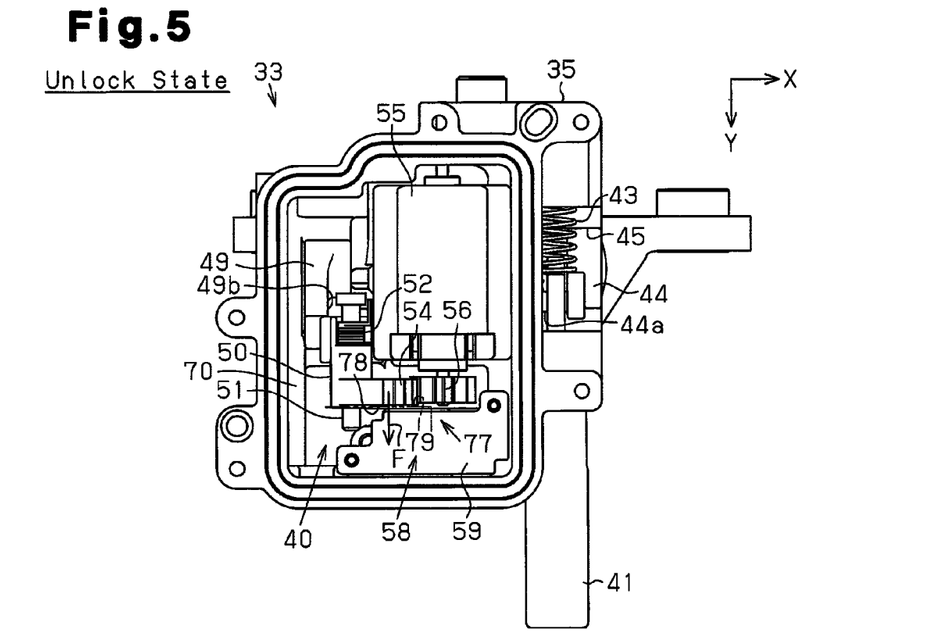
FIG. 5 is a plan view showing the power plug locking device in an unlock state.
Figure 6:
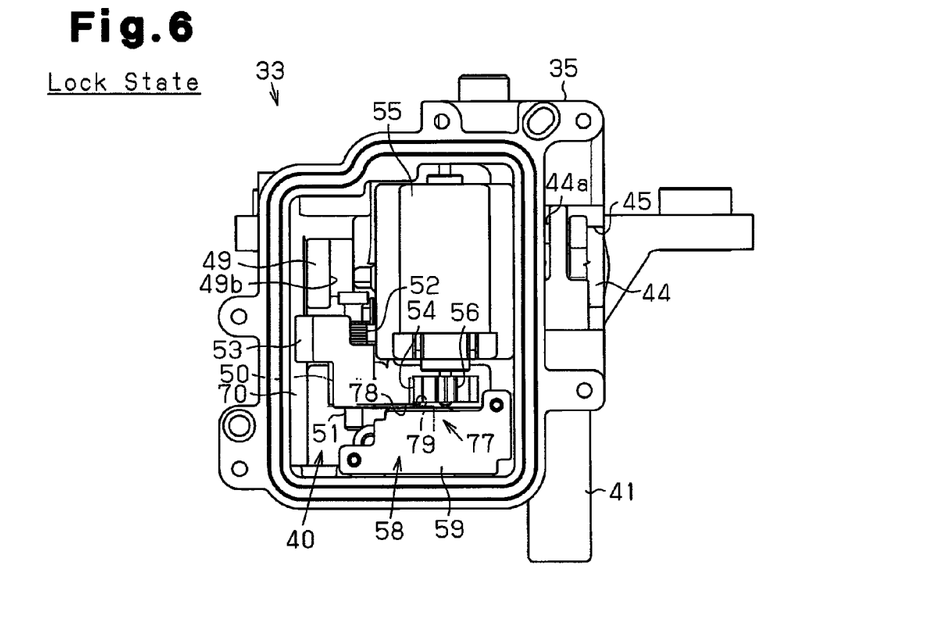
FIG. 6 is a plan view showing the power plug locking device in a lock state.

Referring to FIGS. 4 to 6, the power reception connector 21 includes a power plug locking device 33 (hereinafter simply referred to as "locking device 33"), which prevents unauthorized removal of the power plug 19 from the inlet 24. The locking device 33 functions in two states, namely, an unlock state and a lock state. In the lock state, removal of the power plug 19 from the inlet 24 is prohibited. In the unlock state, removal of the power plug 19 from the inlet 24 is permitted. In the present embodiment, the locking device 33 is manually switched from the unlock state to the lock state. The locking device 33 includes a mechanical structure that may hold the locking device 33 in the lock state. Further, the locking device 33 automatically switches from the lock state to the unlock state, for example, in cooperation with the unlocking of the vehicle door. However, in the present embodiment, the locking device 33 may also be manually switched from the lock state to the unlock state.

The locking device 33 includes a case 34, which is box-shaped and has a low profile. The case 34 includes a lock body 35 and a lid 36. The lock body 35 is box-shaped, has an open upper end, and accommodates components of the locking device 33. The lid 36 is generally plate-shaped and closes the upper opening of the lock body 35. Fastening pins 37 fasten the lid 36 to the lock body 35. The fastening pins 37 are, for example, screws. A recess 38 is formed in the front side of the case 34. The lock arm 27 moves through the recess 38. The lock body 35 (i.e., case 34) is fixed to the inlet 24 by a plurality of fastening members (not shown).

A seal 39 is arranged between the lock body 35 and the lid 36 to hermetically seal the case 34. The seal 39 is, for example, an O-ring. Further, the seal 39 is one example of a water resistant unit.

The locking device 33 includes a lock mechanism 40, which is arranged in the case 34, and a lock button 41, which is arranged in the front side of the lock body 35 and operated when manually switching the lock mechanism 40 to the lock state. The lock button 41 is coupled to the lock body 35 and movable back and forth with respect to the locking device 33 in the Y axis direction as viewed in FIG. 4. In the present example, the lock button 41 is cylindrical and movably fitted into a button receptacle 42 formed in the lock body 35. Part of the lock button 41 is exposed from the lock body 35. An urging member 43 is arranged between the lock button 41 and the bottom surface of the button receptacle 42 to urge the lock button 41 outward from the button receptacle 42. The urging member 43 is, for example, a spring. The lock button 41 is one example of a manual operation unit, and the Y axis direction is one example of an operation direction of the lock button 41.

The lock mechanism 40 includes a lock bar 44, which restricts movement of the lock arm 27 to the opening position. The lock bar 44 is cylindrical and pivotally coupled to the lock button 41. When the lock bar 44 is arranged in the case 34, the axis La of the lock bar 44 extends in the widthwise direction of the locking device 33, that is the X axis direction as viewed in FIG. 4. In this example, the lock bar 44 is arranged to be pivotal about the axis La in a lock bar accommodation portion 45. A tab extends sideward from the lock bar 44. The tab includes a pin 44a, which is engaged with an elongated hole 41a formed in the lock bar 44. When the lock button 41 moves straight along the Y axis direction, the pin 44a is moved in the elongated hole 41a thereby rotating the lock bar 44 around the axis La. The lock bar 44 is one example of a lock member. The pin 44a, which is engaged with the elongated hole 41a, is one example of a conversion portion that converts linear motion of the manual operation unit to rotational motion of the lock member.

The lock bar 44, which is formed by a cylindrical member, includes a hollow portion 46 and a solid portion 47. The hollow portion 46 has a triangular cross-section and is defined by cutting out part of the cylindrical member in a circumferential direction. The solid portion 47 is defined by the remaining part of the cylindrical member (refer to FIGS. 8 and 12). Accordingly, in the lock bar 44, the circumferential surface of the cylindrical member is present only at the solid portion 47 and is not present at the hollow portion 46. When the power plug 19 is completely fitted to the inlet 24, the lock bar 44 is located above the lock arm 27. Thus, when the lock bar 44 rotates, the hollow portion 46 or the solid portion 47 is located above the lock arm 27. When the solid portion 47 of the lock bar 44 is located above the lock arm 27, the solid portion 47 prevents pivoting of the lock arm 27. This holds the lock arm 27 on the inlet 24. When the hollow portion 46 of the lock bar 44 is located above the lock arm 27, pivoting of the lock arm 27 is permitted. In this manner, the lock bar 44 is pivoted between a lock position, at which the lock bar 44 locks the power plug 19 to the inlet 24, and an unlock position, at which the lock bar 44 unlocks the power plug 19.

Referring to FIG. 4, an annular seal 48 is arranged between the lock bar 44 and the lock bar accommodation portion 45 to hermetically seal the case 34. The seal 48 is, for example, a lip seal. Further, the seal 48 is one example of a water resistant unit.

The lock bar 44 includes an end fixed to a triangular lock piece 49. The lock piece 49 is pivoted integrally with the lock bar 44 and extends perpendicular to the axis La of the lock bar 44. The lock piece 49 includes a D-shaped coupling hole 49a, and the end of the lock bar 44 defines a coupling piece 44b. The coupling piece 44b is fitted into the coupling hole 49a to integrally couple the lock piece 49 and the lock bar 44. When the lock bar 44 is pushed and moved inward, the lock piece 49 rotates together with the lock bar 44 in a lock direction (the direction of arrow K1 in FIG. 4). Thus, inward movement of the lock button 41 rotates the lock bar 44 from the unlock position to the lock position. On the other hand, outward movement of the lock button 41 rotates the lock piece 49 together with the lock bar 44 in an unlock direction (the direction of arrow S1 in FIG. 4).

A lock link 50 is pivotally supported by a pin 51, which extends in the Y axis direction, in the case 34. The lock link 50 holds the lock bar 44 at the lock position in cooperation with the lock piece 49. The pin 51, which pivots the lock link 50, has an axis Lb, which is perpendicular to the axis La of the lock bar 44, that is, a rotation axis of the lock piece 49. An urging member 52 is arranged on the lock link 50 to urge the lock link 50 in the lock direction (the direction of arrow K2 in FIG. 4). Thus, the lock link 50 is pivoted in a lock direction by the urging force of the urging member 52 and pivoted in an unlock direction (the direction of arrow S2 in FIG. 4) against the urging force of the urging member 52. The urging member 52 is, for example, a torsion spring.

The lock link 50 includes a restriction portion 53, which restricts pivoting of the lock piece 49 in the unlock direction S1 resulting from the urging force of the urging member 43. The restriction portion 53 is formed at a side wall of the lock link 50. When the lock piece 49 pivots in the lock direction K1, the lock piece 49 moves away from the restriction portion 53 of the lock piece 49, and the urging force of the urging member 52 rotates the lock link 50 in the lock direction K2. In this state, the restriction portion 53 is located between the lock piece 49 and an inner surface of the case 34 thereby maintaining the lock bar 44 in a lock state.

The lock link 50 includes a gear 54, which is arranged on the opposite side of the restriction portion 53. The gear 54 includes teeth arranged in the rotation direction of the lock link 50. The gear 54 is connected to a power plug lock motor 55, which returns the lock bar 44 from a lock state to an unlock state. The motor 55 has a motor shaft including a gear 56, which is meshed with the gear 54 of the lock link 50. The motor shaft of the motor 55 extends in the Y axis direction. The motor 55 is, for example, a DC motor and connected by a harness 57 to a power supply +B of the vehicle 1. When the motor 55 produces rotation, the lock link 50 rotates in a direction opposite to the rotation direction of the motor 55. The power plug lock motor 55 is one example of a driving device. In the present example, a position holding unit includes the lock piece 49, the lock link 50, the urging member 52, and the power plug lock motor 55.

An illumination unit 58 is arranged in the case 34 to illuminate the surrounding of the inlet 24 during the nighttime or the like. The illumination unit 58 includes a substrate 59, which is arranged in the case 34. A light source 60, such as a light source 60, is arranged on the substrate 59. The power supply +B of the vehicle 1 is connected by a harness 61 to the substrate 59 and fixed by fastening pins 62 to the case 34.

A lens 63 is coupled to the lock body 35 to dim the illumination light from the light source. The lens 63 is fastened by fastening pins 64 to the lock body 35. A seal 65 is arranged between the lock body 35 and the lens 63 to hermetically seal the case 34. The seal 65 is, for example, a lip seal. Further, the seal 65 is one example of a water resistant unit.

The locking device 33 includes a lock release unit 70, which is manually operated (pushed) to forcibly release the locking device 33 from a lock state. The lock release unit 70 is coupled to the case 34 so as to be linearly movable back and forth in the Y axis direction. For example, the lock release unit 70 is relatively planar and has a middle stepped part. The lock release unit 70 has one end defining a knob 71, which is exposed, for example, in the trunk of the vehicle 1. Thus, the lock release unit 70 may be operated from inside the trunk by opening the trunk.

The lock release unit 70 includes a sloped portion 72 and a pushing portion 73. When the knob 71 is pushed, the sloped portion 72 forcibly pivots the lock link 50 in the unlock direction S2 against the urging force of the urging member 52. The pushing portion 73 forcibly pivots the lock piece 49 in the unlock direction S1. When the lock release unit 70 is pushed, the sloped portion 72 pushes and lowers a protrusion 74 of the lock link 50 to pivot the lock link 50 in the unlock direction S2 (refer to FIG. 17). The protrusion 74 is formed in the proximity of the restriction portion 53 in the circumferential direction of the lock link 50. When the lock release unit 70 is further pushed, the pushing portion 73 pushes an abutment surface 75 of the lock piece 49 to pivot the lock piece 49 in the unlock direction S1. In the present example, a manual releasing unit includes the lock release unit 70, the protrusion 74, and the abutment surface 75.

An urging member 76 is arranged between an inner surface of the case 34 and the lock release unit 70 to return the pushed lock release unit 70 to its original initial position. The urging member 76 is, for example, a coil spring.

Referring to FIGS. 5 and 6, the case 34 includes an unauthorized unlocking prevention portion 77, which prevents the locking device 33 from being released from a lock state in an unauthorized manner. The unauthorized unlocking prevention portion 77 prevents, for example, an unauthorized person from forcibly rotating the lock bar 44 in the unlock direction with a screwdriver or the like.

In the present example, a support surface 79, which is formed in the inner surface of the case 34, defines the unauthorized unlocking prevention portion 77. When the lock bar 44, which is held at a lock position, is pivoted in an unauthorized manner toward the unlock position, stress acting in the direction of arrow F as shown in FIG. 5 is applied by the lock bar 44 to the lock piece 49. The stress is transmitted from the lock piece 49 to the lock link 50. In this state, a flat outer surface 78 of the lock link 50 comes into contact with a support surface 79 over a wide range. More specifically, the outer surface 78 of the lock link 50 comes into contact with the support surface 79 at a plane (X-Z plane in FIG. 5) that is perpendicular to the direction F in which stress is transmitted. This prevents unauthorized unlock operations from being performed on the locking device 33.

Figure 7:
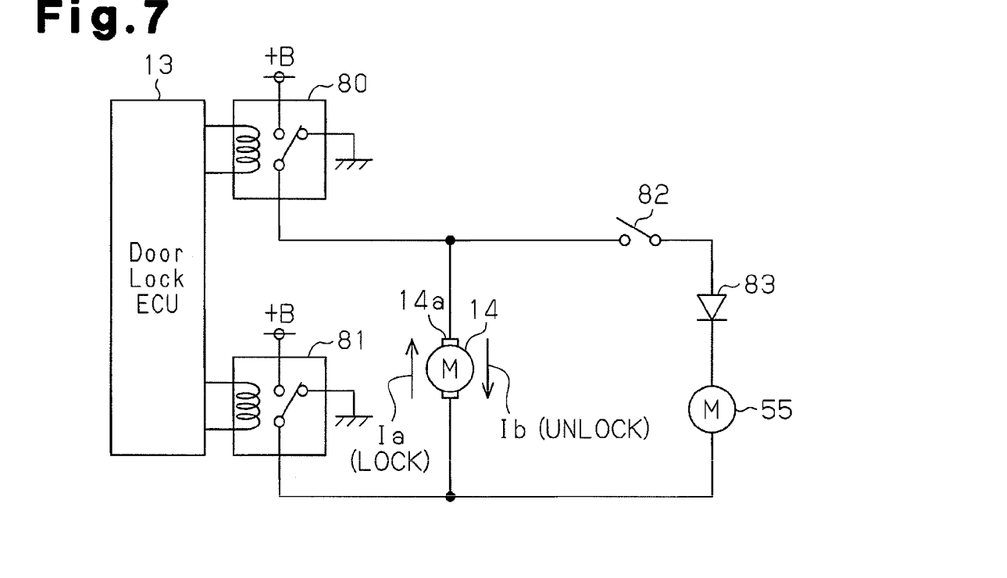
FIG. 7 is a circuit diagram showing the electrical configuration of the power plug locking device.

Referring to FIG. 7, the door lock ECU 13 is connected to an unlock relay 80, which is activated during a door unlock operation, and a lock relay 81, which is activated during a door lock operation. The door lock motor 14 is connected between the relays 80 and 81. When the vehicle 1 receives a door lock request signal from the electronic key 6, the door lock ECU 13 deactivates the unlock relay 80 and activates the lock relay 81 to produce forward rotation with the door lock motor 14. When the vehicle 1 receives a door unlock request signal from the electronic key 6, the door lock ECU 13 activates the unlock relay 80 and deactivates the lock relay 81 to produce reverse rotation with the door lock motor 14.

The power plug lock motor 55 is connected in parallel to the door lock motor 14 by a harness extending from a power supplying circuit of the door lock motor 14. A plug lock detector 82 is connected to the harness of the power plug lock motor 55. The plug lock detector 82 is, for example, a microswitch and mechanically activated when the lock button 41 is operated to shift the lock mechanism 40 to a lock state. A diode 83, which prevents the flow of reverse current, is connected between the power plug lock motor 55 and the plug lock detector 82.

Referring to FIG. 7, during a door locking operation, current Ia flows from the lock relay 81 to the unlock relay 80. Thus, the voltage at the unlock terminal 14a of the door lock motor 14 becomes a low potential. Current does not flow to the power plug lock motor 55 regardless of whether the plug lock detector 82 is activated or deactivated. Thus, the power plug lock motor 55 is not actuated. The door lock motor 14 includes a positive terminal and a negative terminal. Among these terminals, the unlock terminal 14a refers to the one that has a high potential when the door lock motor 14 performs a door unlocking operation.

During a door unlocking operation, current Ib flows from the unlock relay 80 to the lock relay 81. Thus, the voltage at the unlock terminal 14a becomes a high potential. Due to the current Ib, the voltage at the unlock terminal 14a is a high potential. In this state, when the plug lock detector 82 is activated, current flows to the power plug lock motor 55 to perform an unlocking operation with the locking device 33.

The operation of the locking device 33 will now be described with reference to FIGS. 8 to 17.

Figure 8:
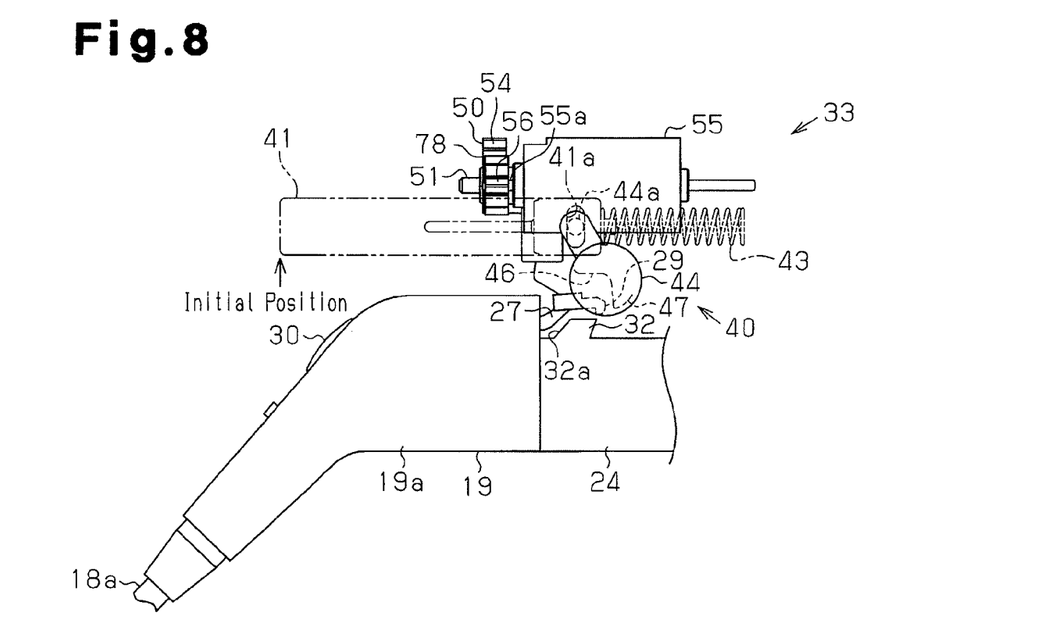
FIG. 8 is a side view showing the power plug locking device in an unlock state.
Figure 9:
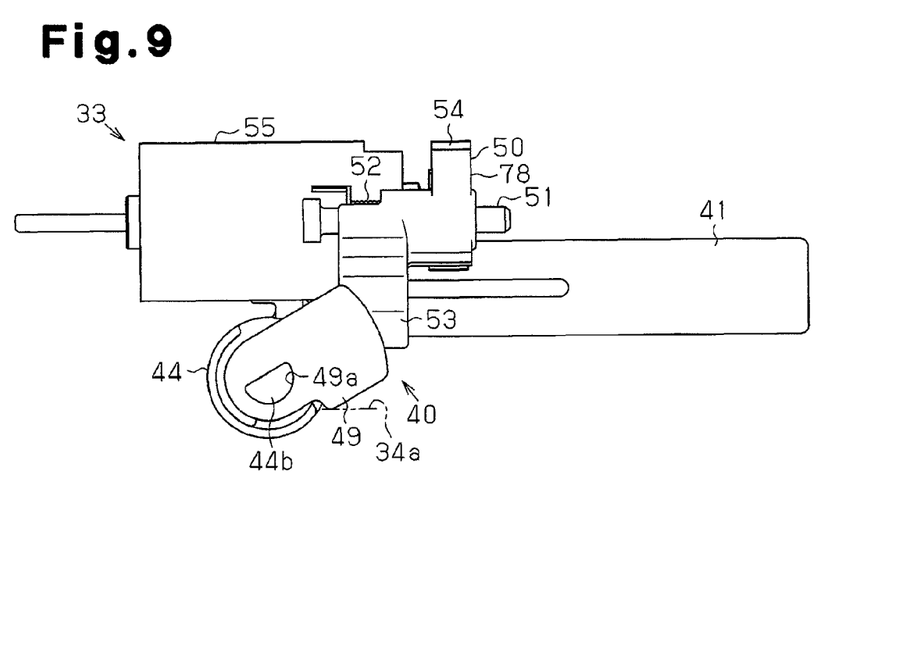
FIG. 9 is a side view showing a lock mechanism in the unlock state.
Figure 10:
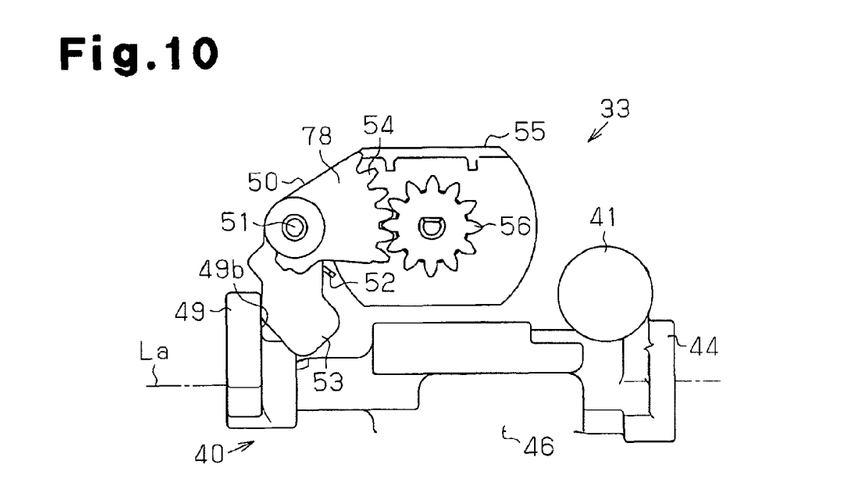
FIG. 10 is a front view showing the lock mechanism in the unlock state.

FIGS. 8 to 10 show the locking device 33 in an unlock state. Referring to FIG. 8, the lock button 41 is projected out of the case 34 by the urging force of the urging member 43 and located at an initial position. The lock bar 44 is located at a rotational position at which the hollow portion 46 faces the projection 32 (unlock position), and thus the hollow portion 46 is effective. Accordingly, the locking device 33 is in an unlock state. Thus, the lock arm 27 may be pivoted, and the power plug 19 may be freely fitted to and removed from the inlet 24.

As shown in FIG. 9, when the lock bar 44 is located at the unlock position, the lock piece 49 is in contact with an inner surface 34a of the case 34 and arranged at an unlock position. In this state, as shown in FIG. 10, a wall surface 49b of the lock piece 49 supports the restriction portion 53 and restricts rotation of the lock link 50 in the lock direction K2. This holds the locking device 33 in an unlock state. The wall surface 49b corresponds to a wall.

Figure 11:
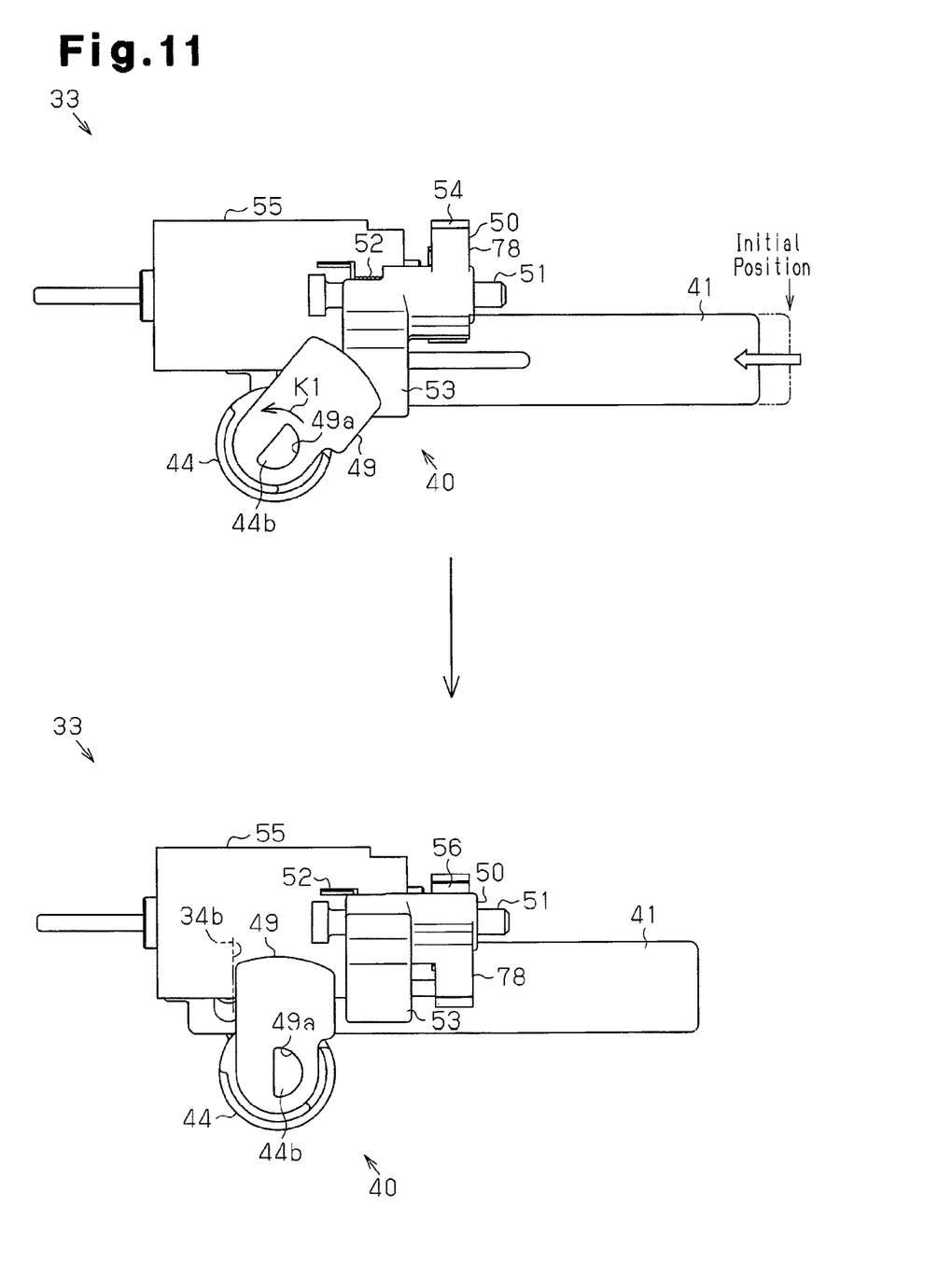
FIG. 11 is a side view showing a lock piece pivoted by a lock button.

Referring to FIG. 11, a user connects the power plug 19 to the inlet 24 and pushes the lock button 41 at the initial position to switch the locking device 33 from an unlock state to a lock state. The lock button 41 is moved against the urging force of the urging member 43 until coming into contact with the case 34. When the lock button 41 is pushed, the lock bar 44 pivots integrally with the lock piece 49 in the lock direction K1 (refer to FIG. 4).

Figure 12:
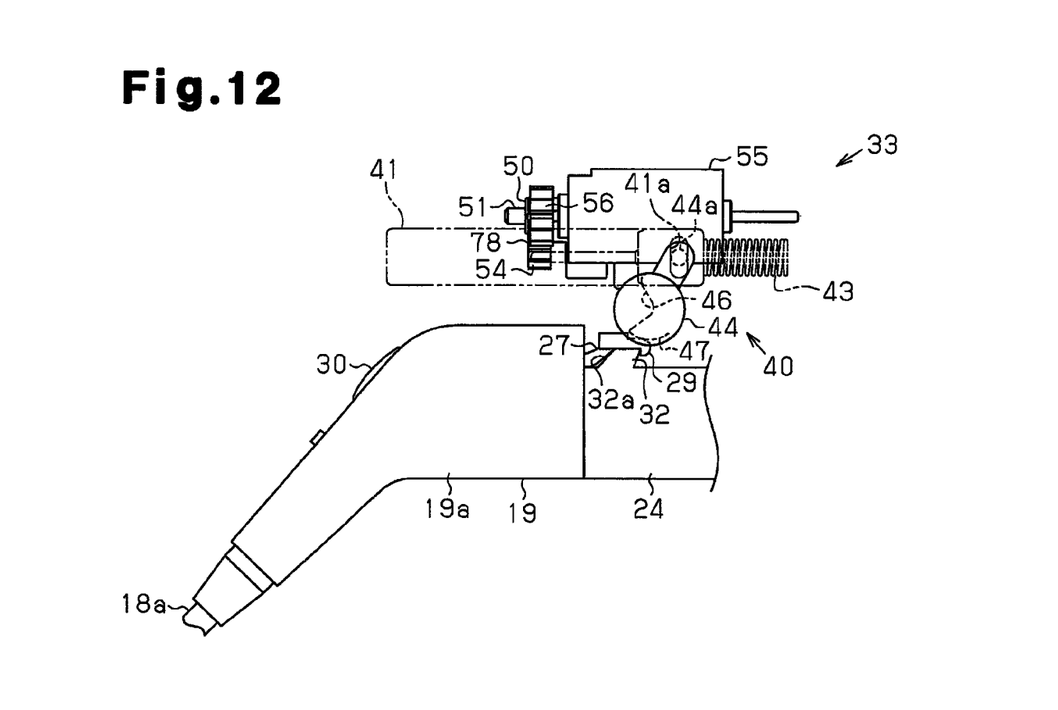
FIG. 12 is a side view showing the power plug locking device in a lock state.

Further, referring to FIG. 11, when the lock button 41 is pushed until the lock piece 49 comes into contact with the inner surface 34b of the case 34, the lock bar 44 is rotated by about 60 degrees. In this state, as shown in FIG. 12, the solid portion 47 of the lock bar 44 becomes effective. This restricts upward pivoting of the lock arm 27, which is hooked to the projection 32. Thus, the locking device 33 locks the power plug 19 to the inlet 24. That is, the locking device 33 shifts from the unlock state to the lock state.

Figure 13:
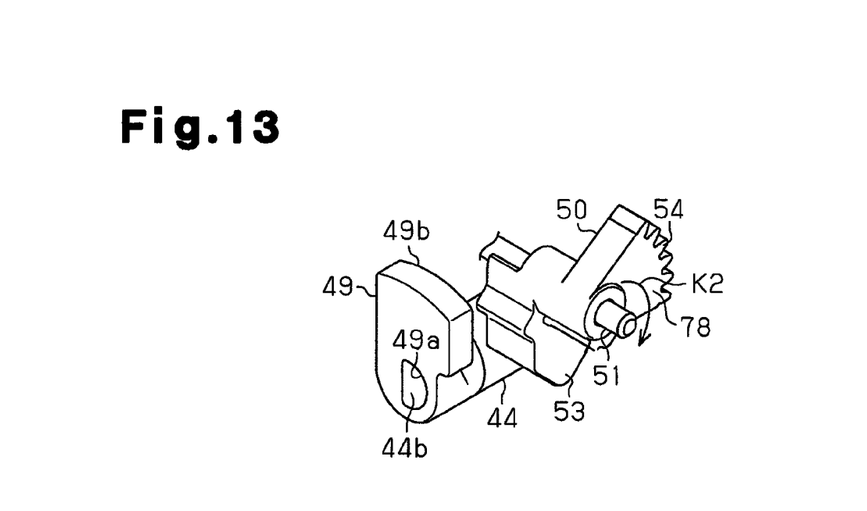
FIG. 13 is a perspective view showing the lock mechanism when a locking operation starts.

Referring to FIG. 13, when the lock piece 49 is fully rotated to the lock position, the wall surface 49b of the lock piece 49 is moved away from the lock link 50. Thus, the urging force of the urging member 52 rotates the lock link 50 in the lock direction K2.

Figure 14A:
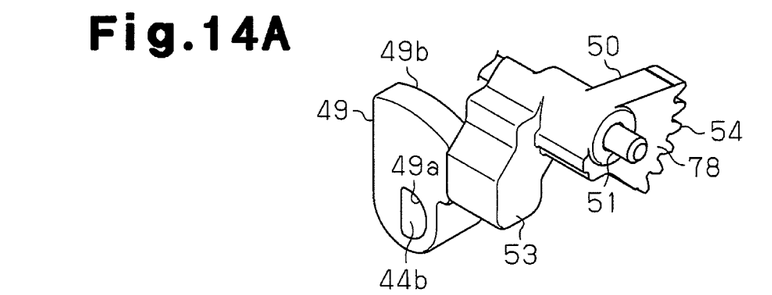
FIG. 14A is a perspective view showing the lock mechanism in a lock state.
Figure 14B:
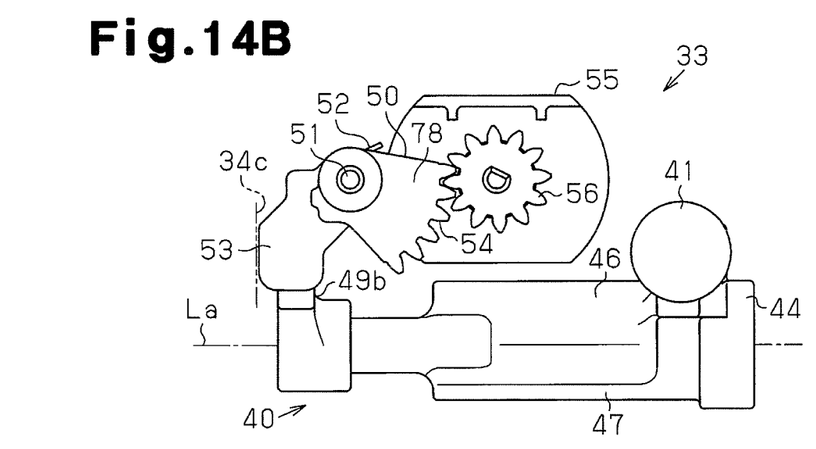
FIG. 14B is a front view showing the lock mechanism of FIG. 14A.

Then, referring to FIGS. 14A and 14B, when the lock link 50 is rotated by about 45 degrees, the restriction portion 53 of the lock link 50 comes into contact with the inner surface 34c of the case 34. This moves the restriction portion 53 into the gap between the lock piece 49 and an inner surface of the case 34. Thus, rotation of the lock piece 49 is prohibited in the unlock direction S1. Accordingly, the lock bar 44 is held at the lock position. That is, the locking device 33 is maintained in the lock state. When the lock bar 44 is located at the lock position, the plug lock detector 82 is mechanically activated.

Figure 15:
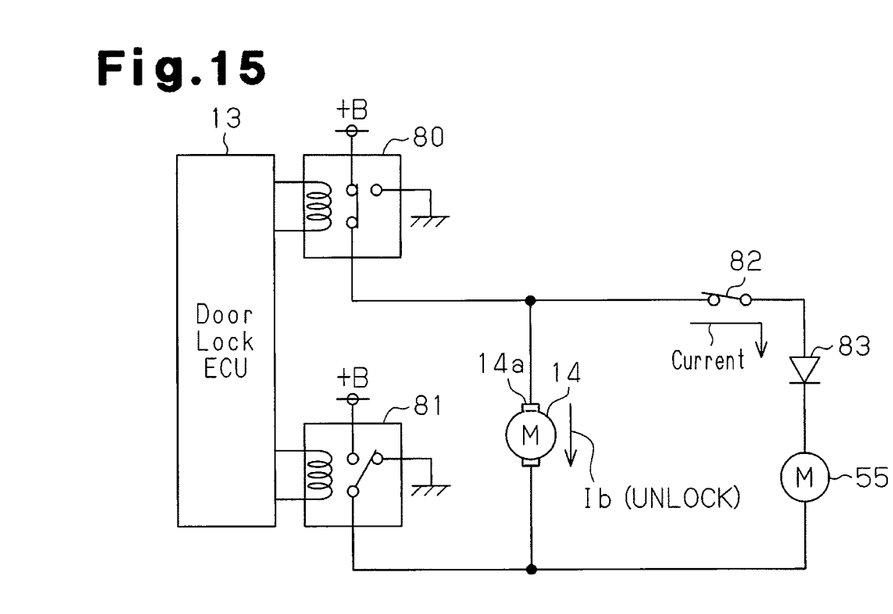
FIG. 15 is a schematic circuit diagram of the power plug locking device during an unlock operation.

When the locking device 33 is in the lock state and a door unlocking operation is performed, the locking device 33 performs an unlock operation in cooperation with the door unlocking operation. Referring to FIG. 15, during the door unlocking operation, current Ib (unlock current) flows to the door lock motor 14 and the voltage at the unlock terminal 14a becomes a high potential. Further, the plug lock detector 82 is activated. Accordingly, some of the current Ib flows to the power plug lock motor 55, which produces rotation.

Figure 16A:
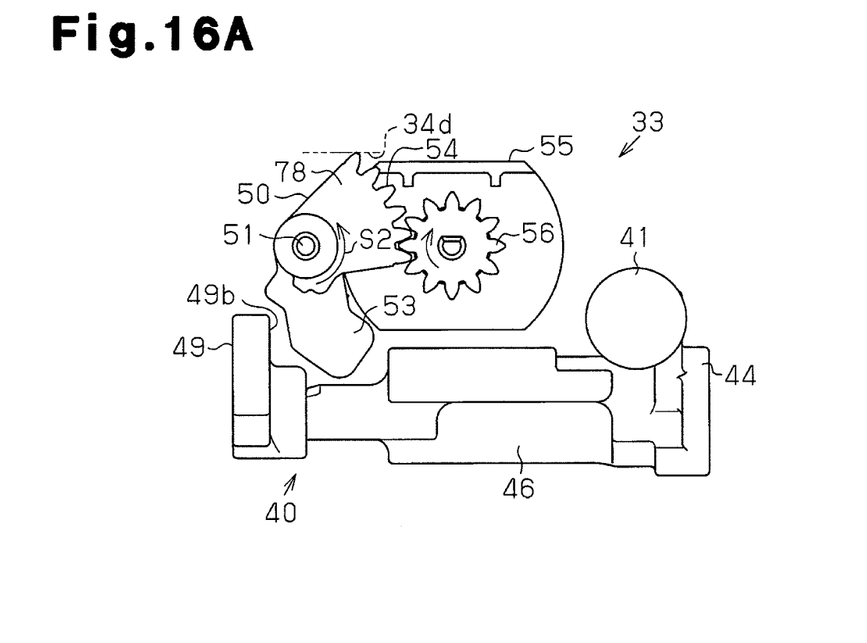
FIG. 16A is a front view showing the lock mechanism when an unlocking operation starts.

Referring to FIG. 16A, the rotation of the power plug lock motor 55 is transmitted by the gears 54 and 56 to the lock link 50. This rotates the lock link 50 in the unlock direction S2 against the urging force of the urging member 52. The lock link 50 rotates until coming into contact with an inner surface 34d of the case 34.

Figure 16B:
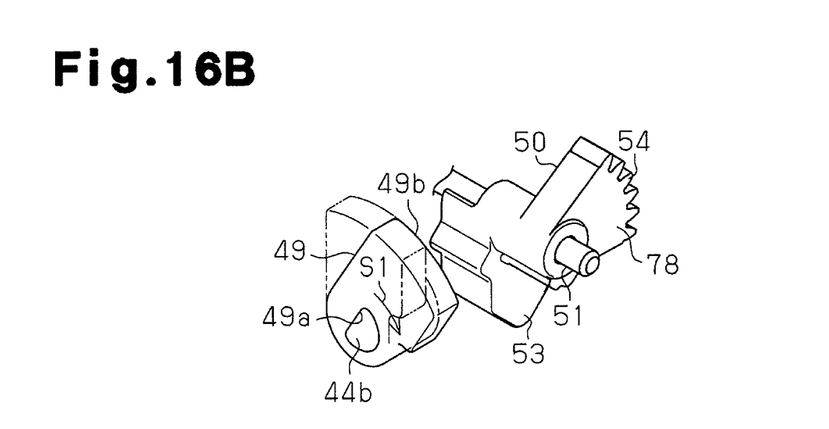
FIG. 16B is a perspective view showing the lock mechanism of FIG. 16A.

Referring to FIG. 16B, when the lock link 50 is fully rotated in the unlock direction, the lock piece 49 is released from the lock link 50 (the restriction portion 53). Thus, the lock piece 49 is rotated by the urging force of the urging member 43 in the unlock direction S1 until coming into contact with the inner surface 34a of the case 34 (refer to FIG. 9). The rotation of the lock piece 49 in the unlock direction S1 rotates the lock bar 44 to the unlock position and returns the lock button 41 to the initial position. This returns the power plug locking device 33 to the unlock state.

When the locking device 33 cannot be released from the lock state for one reason or another, the lock release unit 70 is operated to manually release the locking device 33 from the lock state. As described above, the knob 71 of the lock release unit 70 is arranged in the trunk of the vehicle 1. Thus, only an authorized user, who carries the electronic key 6 that may unlock doors, is able to manually switch the locking device 33 to the unlock state.

Figure 17A:
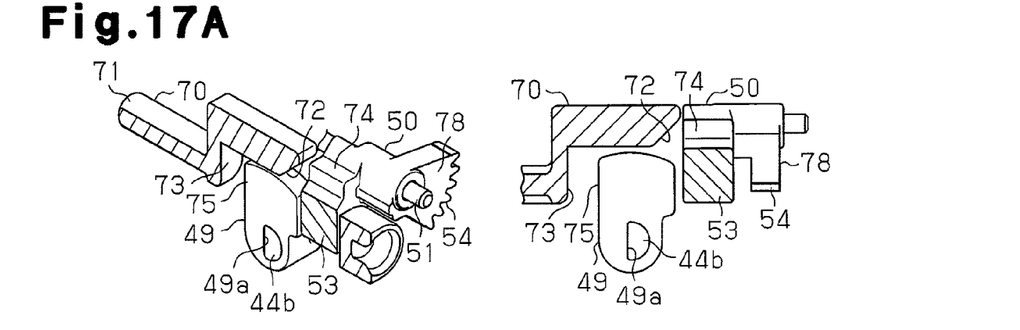
FIGS. 17A to 17D are perspective and side views showing a manual unlocking operation of the power plug locking device.
Figure 17B:
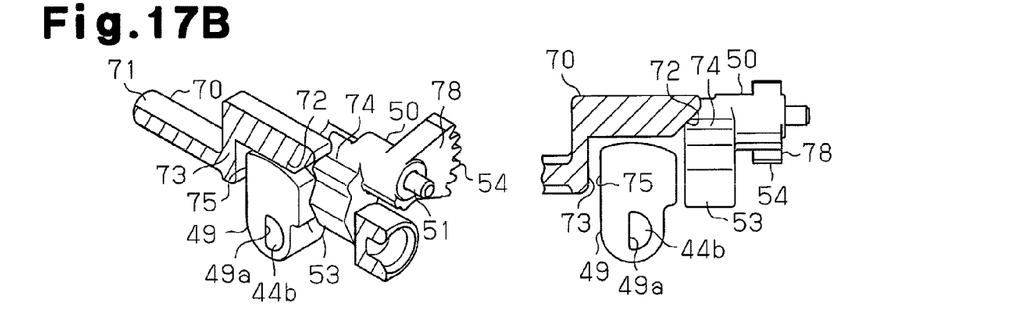

Referring to FIG. 17A, when manually releasing the locking device 33 from the lock state, the user pushes the knob 71 of the lock release unit 70. Referring to FIG. 17B, when the lock release unit 70 is pushed, the sloped portion 72 of the lock release unit 70 pushes the protrusion 74 of the lock link 50 downward. This applies force to the lock link 50 in the unlock direction S2. Accordingly, the lock link 50 starts to rotate in the unlock direction S2 against the urging force of the urging member 52.

Figure 17C:
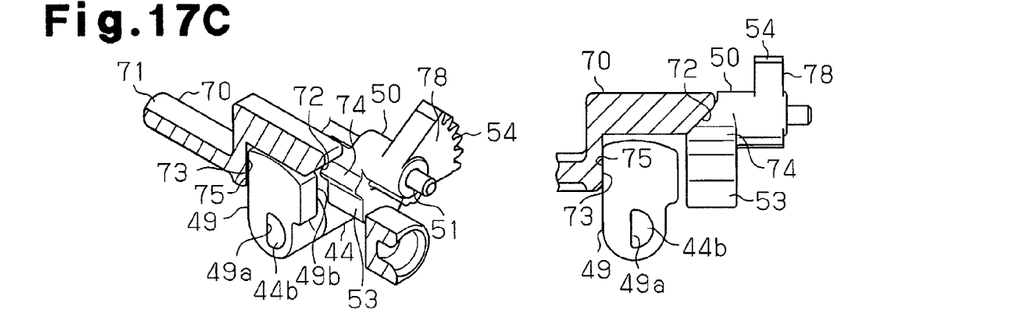

Referring to FIG. 17C, when the lock release unit 70 is further pushed, the pushing portion 73 of the lock release unit 70 comes into contact with the abutment surface 75 of the lock piece 49. When the lock release unit 70 is further pushed, the lock release unit 70 moves straight while pushing the lock piece 49.

Figure 17D:
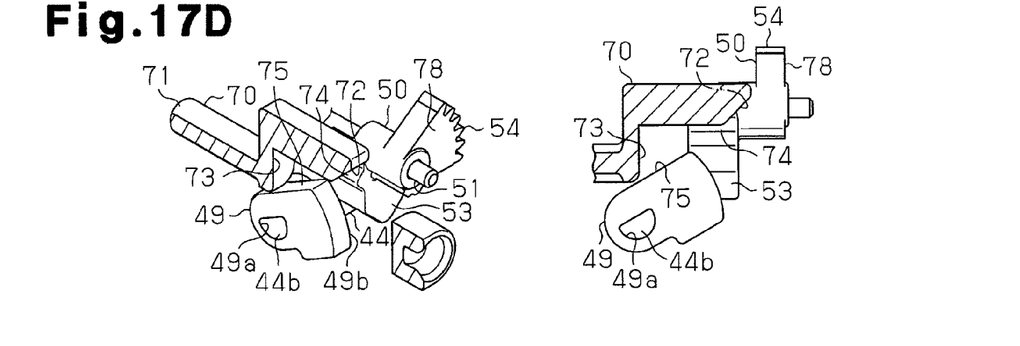

Referring to FIG. 17D, the pushing of the lock release unit 70 pivots the lock piece 49 in the unlock direction S1. When the lock piece 49 rotates in the unlock direction S1, the lock bar 44 also rotates in the unlock direction, and the lock button 41 returns to the initial position. Thus, the locking device 33 may be manually switched from a lock state to an unlock state.

As described above, in the present example, the locking device 33 includes the lock button 41 that is used when manually performing a locking operation with the locking device 33. This allows the user to perform a locking operation with the locking device 33 only when necessary. If the locking operation of the locking device 33 were to be performed in cooperation with the locking of the vehicle door, the locking device 33 would perform a locking operation whenever a vehicle door locking operation is performed, even when the power plug 19 is not connected to the inlet 24. This results in early component wear. In contrast, in the present example, the locking device 33 performs a locking operation only when the lock button 41 is manually operated. Thus, the locking device 33 does not perform unnecessary locking operations. This prevents early component wear.

If the locking device 33 were to have a lock bar that is moved straight between a lock position and an unlock position to switch between a lock state and an unlock state, the locking device 33 would require space allowing for the linear movement of the lock bar. This enlarges the locking device 33.

In contrast, in the present example, the lock bar 44 is arranged so as to be pivoted about the axis La extending in the longer direction of the cylindrical member to switch the lock mechanism 40 between a lock state and an unlock state. Thus, the lock bar 44 locates at a predetermined position. As a result, in the locking device 33, there is no need to ensure the space allowing for the linear movement of the lock bar as described above. Accordingly, the locking device 33 may be reduced in size.

The power plug locking device 33 according to the present embodiment has the advantages described below.

(1) The locking device 33 includes the lock button 41 used for performing a manual lock operation. Thus, in comparison to a power plug locking device that functions in cooperation with the locking operation of the vehicle door, early component wear may be prevented. Further, the lock bar 44 is pivoted about its axis La thereby switching the lock mechanism 40 between the lock state and the unlock state. Thus, the space occupied by the lock bar 44 may be reduced, and the size of the locking device 33 may be reduced.

(2) The lock button 41 is of a pushing operation type (linear operation type), and the lock bar 44 may be pivoted by pushing the lock button 41. This simplifies the structure of the locking device 33.

(3) The locking device 33 includes the seals 39, 48, and 65 to improve the water resistance of the case 34. This prevents the power plug lock motor 55 and the substrate 59 in the case 34 from being damaged by water (fluid).

(4) The locking device 33 includes the lock release unit 70, which allows for a manual operation to release the locking device 33 from a lock state. When the power plug lock motor 55 does not move for one reason or another, the locking device 33 may not be automatically released from a lock state. Even in such a situation, the lock release unit 70 may be operated to manually release the locking device 33 from the lock state. Further, the knob 71 of the lock release unit 70 is arranged in the trunk. Accordingly, only an authorized user, who is carrying the electronic key 6, may unlock the doors to operate the lock release unit 70 in the trunk. This prevents unauthorized manual operations.

(5) The lock body 35 of the locking device 33 is fixed to the inlet 24, and the lock bar 44 is arranged on the lock body 35. Thus, even when an unauthorized person applies external force to the lock bar 44 in the unlock direction to release the locking device 33 from a lock state without authorization, the lock body 35, which is securely fixed to the inlet 24, receives the external force with the lock body 35. This prevents external force forcibly applied to the lock bar 44 from damaging the case 34 and makes unauthorized unlocking difficult.

(6) The unlocking operation of the locking device 33 is performed in cooperation with a vehicle door unlocking operation. Thus, when the locking device 33 is switched to an unlock state, a separate or special operation is not required. This improves convenience.

(7) The locking device 33 includes the support surface 79, which is defined by an inner surface of the case 34, as the unauthorized unlocking prevention portion 77. When an unauthorized person forcibly pivots the lock bar 44 in the unlock direction to release the power plug locking device 33 from a lock state, the force applied to the lock bar 44 is transmitted by the lock piece 49 to the lock link 50. In this case, the flat outer surface 78 of the lock link 50 comes into contact with the support surface 79 over a wide area (refer to FIGS. 5 and 6). In this manner, the support surface 79 receives the stress produced by an unauthorized unlock operation. Thus, it is difficult to perform unauthorized unlocking.

(8) The lock button 41, the lock piece 49, and the lock link 50 stop moving when coming into contact with the inner wall of the case 34. That is, the inner wall of the case 34 positions the lock button 41, the lock piece 49, and the lock link 50 at an operation stop position. This eliminates the need for a sensor that monitors the position of each component and simplifies the structure of the locking device 33.

It should be apparent to those skilled in the art that the present invention may be embodied in many other specific forms without departing from the spirit or scope of the invention. Particularly, it should be understood that the present invention may be embodied in the following forms.

The conditions for starting the charging of the battery 5 may be changed. For example, charging may be started when the plug connection detector 25 detects that the power plug 19 has been fitted to the inlet 24 and that ID verification of the electronic key 6 has been satisfied.

The operation for manually releasing the locking device 33 from a lock state is not limited to a pushing operation and may be, for example, a pulling operation. For example, a wire may be used to directly pivot the lock piece 49 or the lock link 50 in the unlock direction.

The plug lock detector 82 is not limited to a mechanical switch (micro-switch) and may be, for example, a sensor.

The electric circuit of the power plug lock motor 55 may include a switch, such as a transistor or relay, connected to the unlock terminal 14a via the plug lock detector 82. In this case, the activation and deactivation of the switch is switched based on the voltage (current) at the unlock terminal 14a to control the operation of the power plug lock motor 55.

The locking device 33 may include a control IC that supplies the power plug lock motor 55 with current for performing an unlock operation when determining that the locking device 33 is in a lock state and that a vehicle door unlocking operation is being performed.

The charging of the battery 5 may be stopped by a switch arranged in the vehicle.

The unauthorized unlocking prevention portion 77 is not limited to the support surface 79 and may have any structure as long as an external operation force for performing unauthorized unlocking is received with a wide surface of the case 34.

The unlocking operation of the locking device 33 is not limited to be performed in cooperation with the door unlocking operation of the vehicle door, and may be, for example, performed by manual operation.

The electronic key system 7 is not limited to a wireless key system. For example, the electronic key system 7 may be a key-operation-free system that performs ID verification when communication with the vehicle starts or be a near field wireless authentication system that complies with any of various near field communication (NFC) standards.

The wireless key system may be an automatic slide door system.

The wireless key system may alternately lock and unlock a door whenever a single button 16 of the electronic key 6 is operated.

The manual operation unit (lock button 41) is not limited to a push operation type (linear operation type) and may be of a rotation type.

In the present invention, an intersection does not have to be perpendicular and may be deviated by a predetermined amount from a perpendicular state.

The structure of the lock mechanism 40 is not limited to the aforementioned embodiment as long as the locking device 33 may be switched to a lock state by manual operation and may be maintained in the lock state.

The lock mechanism 40 may be switched to a lock state when the lock bar 44 is fitted into a hole in the power plug 19.

The lock bar 44 does not have to be formed by a cylindrical member and may be formed by a polygonal member. That is, the lock bar 44 may be formed by a bar element and does not have to have a circular cross-section and may have a polygonal cross-section.

The lock member does not have to be formed by the single lock bar 44, which is arranged above the lock arm 27 and may be formed by a plurality of components including the lock bar 44. In this case, the lock bar 44 restricts the pivoting of the lock arm 27 with a certain member.

The power reception connector 21 may be arranged in a left (or right) front side wall of the vehicle. In this case, the knob 71 of the lock release unit 70 used for manual unlocking may be arranged in a glove compartment in the vehicle.

The driving device is not limited to a motor and may be, for example, solenoids.

The structures of the manual operation unit, the position holding unit, and the water resistant unit are not limited to the foregoing description and may be changed in accordance with the structure and shape of the locking device 33.

The vehicle 1 is not limited to a hybrid vehicle and may be an electric vehicle that is driven by only a motor.

The locking device 33 is applied to the vehicle 1 but may be applied to other devices and apparatuses.

The present examples and embodiments are to be considered as illustrative and not restrictive, and the invention is not to be limited to the details given herein, but may be modified within the scope and equivalence of the appended claims.

The invention claimed is:

1. A power plug locking device that prevents unauthorized removal of a power plug from an inlet, the power plug including a lock arm which is pivotable and which is engageable with the inlet, the power plug locking device comprising:
  a lock member having a longitudinal axis, the lock member being pivotable about the longitudinal axis, wherein the lock member is pivoted between a lock position, at which the lock member locks the power plug to the inlet by restricting pivoting of the lock arm, and an unlock position, at which the lock member releases the power plug from a state locked to the inlet;

a manual operation unit that is manually operable to pivot the lock member from the unlock position to the lock position; and a position holding unit formed to hold the lock member at the lock position and maintain the power plug in a locked state with the lock member.

2. The power plug locking device according to claim 1, wherein:

the manual operation unit is linearly moveable;

the longitudinal axis about which the lock member is pivoted extends in a direction intersecting an operation direction of the manual operation unit;

the lock member is formed by a bar element and includes a hollow portion, which is defined by cutting out part of the bar element in a circumferential direction, and a solid portion, which is defined by the remaining part of the bar element; and when the manual operation unit is operated to pivot the lock member to a position at which the solid portion is effective, the solid portion locks the power feed plug to the inlet.

3. The power plug locking device according to claim 1, further comprising:

a case in which the lock member, the manual operation unit, and the position holding unit are arranged; and a water resistant unit that prevents fluid from entering the case.

4. The power plug locking device according to claim 1, further comprising a manual releasing unit that is manually operable to pivot the lock member from the lock position to the unlock position.

5. The power plug locking device according to claim 1, further comprising a case in which the lock member, the manual operation unit, and the position holding unit are arranged, wherein the case includes a body fixed to the inlet, and the lock member is coupled to the body.

6. The power plug locking device according to claim 1, wherein the power plug locking device is arranged in a vehicle, and the power plug locking device comprises a driving device that produces drive force to pivot the lock member from the lock position to the unlock position.

7. The power plug locking device according claim 1, wherein the position holding unit includes:

a lock piece integrally pivoted with the lock member between a first position, which corresponds to the lock position, and a second position, which corresponds to the unlock position;

a lock link pivoted between a third position, which corresponds to the lock position, and a fourth position, which corresponds to the unlock position, wherein the lock link is formed so that when the lock piece is located at the second position, the lock link is supported by the lock piece and held at the fourth position, when the lock piece pivots from the second position to the first position, the lock link is separated from the lock piece and moved from the fourth position to the third position, and the lock link restricts pivoting of the lock piece at the third position and holds the lock piece at the first position;

an urging member that urges the lock link from the fourth position to the third position; and a driving device that produces drive force to pivot the lock link from the third position to the fourth position against the urging force of the urging member to pivot the lock member from the lock position to the unlock position.

8. The power plug locking device according to claim 7, further comprising an unauthorized unlocking prevention unit that prevents the power plug from being released from the state locked to the inlet in an unauthorized manner, wherein the unauthorized unlocking prevention portion includes a support surface that supports the lock link, and the support surface receives stress transmitted from the lock member to the lock link via the lock piece when the lock member, which is held at the lock position, is pivoted in an unauthorized manner toward the unlock position.

9. The power plug locking device according to claim 1, wherein a linear movement of the manual operation unit causes the lock member to pivot about the longitudinal axis.

* * * * *